United States Patent [19]
McCloskey

[11] 3,871,722
[45] Mar. 18, 1975

[54] ANTI-FRICTION BALL BEARING ASSEMBLY

[75] Inventor: Albert R. McCloskey, Fairfield, Conn.

[73] Assignee: Heim Universal Corporation, Fairfield, Conn.

[22] Filed: Aug. 8, 1972

[21] Appl. No.: 278,790

[52] U.S. Cl. ............................................. 308/6 C
[51] Int. Cl. ........................................... F16c 29/06
[58] Field of Search .................................. 308/6 C

[56] References Cited
UNITED STATES PATENTS
3,330,606   7/1967   Suda ................................. 308/6 C
3,357,753   12/1967  Ionov ............................... 308/6 C
3,567,295   3/1971   Wilkes .............................. 308/6 C OTHER PUBLICATIONS
Machine Design, June 22, 1972, Pg. 116, 118.

Primary Examiner—Charles J. Myhre
Assistant Examiner—R. H. Lazarus

[57] ABSTRACT

An anti-friction ball bearing assembly adapted for mounting on a shaft comprising an outer sleeve and an inner sleeve concentrically fitting within the outer sleeve, the inner sleeve having a number of tracks defining paths for the circulation of a number of load carrying balls and idler balls between the shaft and the bearing assembly, idler balls interposed between said load carrying balls, said idler balls having a diameter somewhat less than said load carrying balls.

7 Claims, 3 Drawing Figures

PATENTED MAR 18 1975  3,871,722

ANTI-FRICTION BALL BEARING ASSEMBLY

BACKGROUND OF THE INVENTION

This invention relates to a ball bearing assembly adapted to move longitudinally along the shaft.

This invention represents an improvement in ball bearing assembly disclosed in Pat. application Ser. No. 189,898 filed in the U.S. Patent Office on Oct. 18, 1971 now U.S. Pat. No. 3,767,276 by Andrew Henn.

In particular the invention relates to an anti-friction ball bearing assembly adapted for mounting on a shaft comprising an outer sleeve and an inner sleeve concentrically fitting within the outer sleeve, the inner sleeve having a number of tracks defining paths for the circulation of a number of load carrying balls and idler balls between the shaft and the bearing assembly, said load carrying balls having idler balls interposed therebetween, said idler balls having a diameter somewhat less than said load carrying balls.

The prior art is replete with different types of anti-friction recirculating ball bearing assemblies. Generally, the prior art recirculating ball bearing systems are basically inefficient mechanisms. This inefficiency is typically caused by the friction encountered between the various moving parts of the recirculating ball bearing assembly. A prime source of this friction is the counter revolving action of the load carrying balls at their respective points of contact.

Another deficiency of the prior art anti-friction recirculating ball bearing assemblies is that they can be relatively noisy in operation. This problem is of course compounded as the various bearing components wear.

SUMMARY OF THE INVENTION

Accordingly, it is an object of the present invention to provide an anti-friction ball bearing assembly adapted for mounting on a shaft comprising an outer sleeve and an inner sleeve concentrically fitting within the outer sleeve, the inner sleeve having a number of tracks defining paths for the circulation of a number of load carrying balls and idler balls between the shaft and the bearing assembly, each of said load carrying balls has an idler ball interposed therebetween, said idler balls having a diameter somewhat less than said load carrying balls.

It is another object of the present invention to provide a highly efficient ball bearing assembly capable of being inexpensively manufactured and being simplistic in design.

Another object of the present invention is to provide an improved anti-friction ball bearing assembly having superior load carrying characteristics.

It is still another object of the present invention to provide an improved anti-friction ball bearing assembly which can be manufactured using automated high volume techniques.

It is yet another object of the present invention to provide a superior low noise anti-friction ball bearing assembly in which the idler balls are manufactured from a self-lubricating plastic material.

Other objects and advantages of the invention will become apparent as the present invention is better understood from the following disclosure and as shown in the accompanying drawings.

DESCRIPTION OF THE INVENTION

Figure 1:
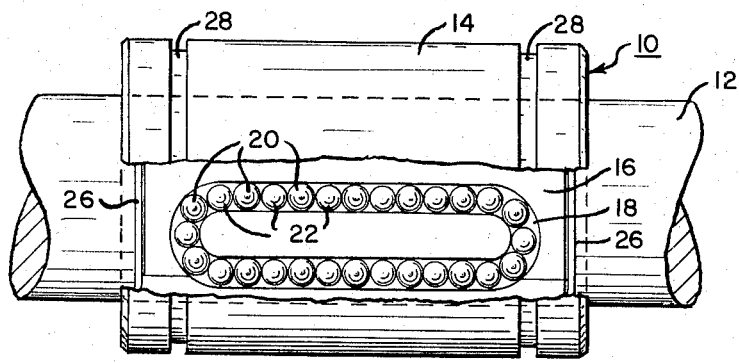
FIG. 1 is a side elevational view, partially cut away, of an anti-friction ball bearing assembly mounted on a shaft embodying the concept of the present invention.
Figure 2:
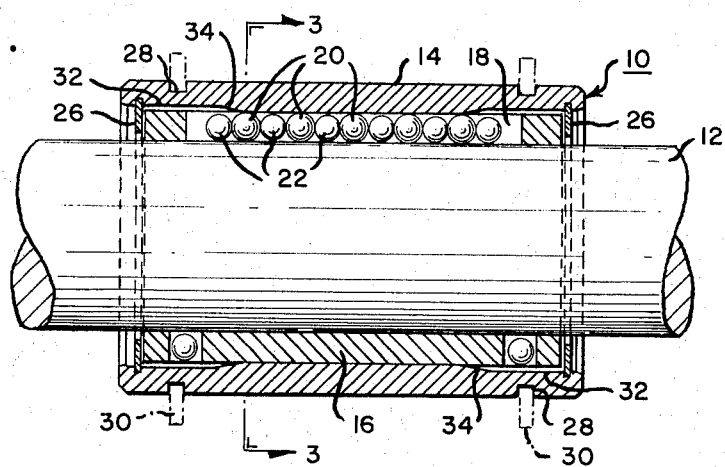
FIG. 2 is a sectional view taken along line 2 — 2 of FIG. 3.
Figure 3:
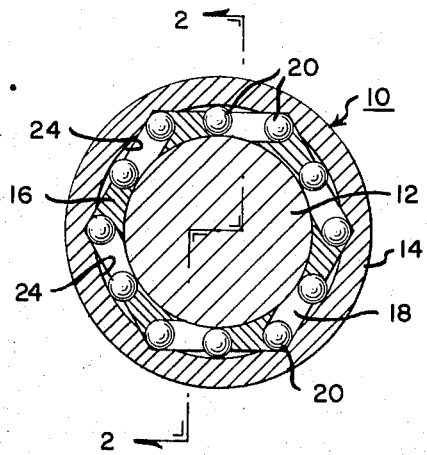
FIG. 3 is a sectional view taken along line 3 — 3 of FIG. 2.

Referring now to the drawings, there is shown an improved anti-friction ball bearing assembly embodying the concept of the present invention wherein the anti-friction ball bearing assembly is generally designated by the numeral 10.

The anti-friction ball bearing assembly is particularly adapted for being mounted, for linear translation, on a shaft 12. The anti-friction ball bearing assembly 10 is provided with an outer sleeve 14 and an inner sleeve 16. The inner sleeve 16 is concentrically interfitted within the outer sleeve 14. The outer surface of the inner sleeve 16 is essentially polyhedronal in shape having a number of axially extending planar surfaces. The inner sleeve 16 if further provided with a number of tracks 18 which define paths for the circulation of the load carrying balls 20 and the idler balls 22. The inner surface of the outer sleeve 14 is similarly substantially polyhedronal in shape. The shape of the inner surface of the outer sleeve 14 generally conforms to the shape of the outer surface 18 of the inner sleeve 16. The inner surface of the outer sleeve 14 has a number of axially extending planar surfaces. The outer surface of the inner sleeve 16 is in registration with the inner surface of the outer sleeve 14 at their respective axial extending planar surfaces.

Each of the axially extending planar surfaces of the outer sleeve 14 are provided with axially extending bearing raceways 24. The axially extending raceways 24 may be located intermediate the lines described by the intersection of the various planar surfaces of the outer sleeve 14.

The idler balls 22 are interposed between the load carrying balls 20. Each of the idler balls 22 has a diameter somewhat smaller than the load carrying balls 20 and will thereby be load isolated. Accordingly, the idler balls 22 will perform, among other things, an idler function between the load carrying balls 22. The idling action of the idler balls 22 will avoid the friction caused by the counter revolving action of the load carrying balls 20 at their respective points of contact. This avoidance of the point-of-contact friction will result in a highly efficient, cool running bearing.

The idler balls 22 could be manufactured from the same material as the load carrying balls 20 such as chrome steel. The material selection will of course depend upon the specific bearing application load requirements, environment and the like.

Examples of such materials are nylon, DELRIN (Trademark of General Electric Co.), polytetrafluoroethylene, heat tempered glass and the like.

The noise abatement properties of many of these materials will reduce the operational noise level of the bearing assembly 10. Additionally, under certain circumstances, a plastic idler ball 22 could be used to provide a preloading force on the load carrying balls 20.

Retaining means such as snap rings 26 are provided at each end of the anti-friction ball bearing assembly 10 to positionally anchor the inner sleeve 16 into outer sleeve 14 to thereby maintain the operational integrity of the anti-friction ball bearing assembly 10. The snap rings 26 therefore maintain the axial position of the inner sleeve 16 with respect to the outer sleeve 14 while the aforementioned registration of the axial extending planar surfaces of the inner sleeve 16 and the outer sleeve 14 maintain the radial position of the inner sleeve 16 with respect to the outer sleeve 14.

The outer sleeve 14 may be substantially cylindrical in shape and may be provided with annular grooves 28. The grooves 34 may be adapted to receive retaining means such as snap rings 30, to positionally anchor or attach the anti-friction ball bearing assembly 10 within or to a bushing or housing member (not shown).

The planar surfaces of the outer sleeve 14 may terminate at each end in a concave end surface 32. These concave end surfaces 32 are recessed with respect to the axially extending planar surfaces of the outer sleeve 14 and axially extending raceways 24. A smooth transition is provided between the raceways 24 and concave end surfaces 32 by means such as tapered surface 34.

As can be seen from the above, the anti-friction ball bearing assembly 10 can be generally described as a linear (circulating) ball bearing. In particular, the anti-friction ball bearing assembly 10 essentially provides linearly moving bearing support between some member such as the above noted bushing (not shown) and shaft 12. As the anti-friction bearing assembly 10 moves along the shaft 12, the load carrying balls 20 and idler ball 22 will tend to roll and circulate in and through the tracks 18 in the inner sleeve 16. The load carrying balls 20 therefore assume two basic positions, an active or loaded position or an inactive or unloaded position. In the active position, the balls 24 will provide rolling support between the outer sleeve 14 (and in turn the bushing or other member to which it is attached) and the shaft 12, as the shaft 12 and anti-friction ball bearing assembly 10 (and bushing) move with respect to each other. In the inactive position, the load carrying balls 20 are in effect doing no useful work but are being recirculated to their active position. The load carrying balls 20 when in their inactive position, are not therefore in contact with the shaft 12. The load carrying balls 20 and the idler balls 22 will circulate in a direction depending upon the relative motion of the anti-friction ball bearing assembly 10 with respect to the shaft 12. The load carrying balls 20 track from their active to inactive position and will be disengaged from the shaft at the time they encounter the tapered sleeves 38. This occurs before the load carrying balls 20 reach the curved portion of the tracks 18. The idler balls 22 have no load imparted to them and they simply idle between the load carrying balls. The inner sleeve also has no load imparted to it by the action of either the load carrying balls 20 or the idler balls 22 and it serves simply as a ball cage. The longitudinal axis of the straight portion of the tracks 18 in which the load carrying balls 20 ride during their unloaded state is generally parallel to the lines described by the intersection of the planar surfaces of the outer sleeve 14. The load carrying balls 20 and the idler balls 22 could be carried in the tracks 18 in a controlled position made by caging means (not shown) such as a wire or plastic retaining means.

The various components of the anti-friction ball bearing assembly 10 could be manufactured from a wide range of materials utilizing a number of fully automated techniques. For example, the outer sleeve 14 could be manufactured from steel such as SAE 5200 steel. Additionally, the sleeve could be suitably coated and/or treated depending upon application and environment.

As mentioned before, the inner sleeve 16 is effectively isolated from all loads. Accordingly, the inner sleeve 16 could be manufactured from an even wider range of materials such as zinc alloys, plastics as well as other moldable materials. Obviously, the balls and/or the various bearing raceways 30 could be coated with a suitable self-lubricating plastic such as polytetrafluoroethylene.

Both the inner sleeve 16 and the outer sleeve 14 could be manufactured using high volume manufacturing techniques. In particular, the design of the outer sleeve 14 renders it particularly adaptable to broaching. The inner surface of the outer sleeve 14 comprising both the axially extending planar surfaces and the raceways 24 could be broached by utilizing a pull or push broach. Preferably, a pull broach would be utilized for such a broach would be less apt to bind during the cutting operation of the inner surface. Other suitable machining and/or molding operations could likewise be utilized to manufacture and fabricate the inner sleeve.

Assembly of the overall anti-friction ball bearing assembly 10 in a like manner could be accomplished by using advance automated techniques.

Obviously, the present invention is not limited to the specific details as herein described, but is capable of other modifications and changes without departing from the spirit and scope of the appended claims.

I claim:

1. An anti-friction ball bearing assembly comprising an outer sleeve and an inner sleeve concentrically fitting within said outer sleeve, said inner sleeve having a central opening for the passage of a shaft therethrough, the inner sleeve having a number of tracks defining paths for the circulation of balls, circulation of a number of load carrying balls and idler balls between said sleeves and said shaft during relative movement between said shaft and said bearing assembly, said idler balls interposed between said load carrying balls, said idler balls having a diameter somewhat less than said load carrying balls, the outer surface of the inner sleeve being polyhedronal in shape, the inner surface of the outer sleeve being provided with a number of guideways, the intersections of the plane portions defining the outer surface of the inner sleeve registering with said guideways, said inner surface of the outer sleeve is further provided with a number of substantially concave bearing surfaces aligned with said tracks such that they provide a rolling bearing surface for said load carrying balls while said load carrying balls are in their loaded state.

2. An anti-friction ball bearing assembly in accordance with claim 1 wherein said load carrying balls and said idler balls are metallic balls.

3. An anti-friction ball bearing assembly in accordance with claim 1 wherein said load carrying balls are metallic balls and said idler balls are non-metallic balls.

4. An anti-friction ball bearing assembly in accordance with claim 3 wherein said idler balls are manufactured from a self-lubricating plastic.

5. An anti-friction ball bearing assembly in accordance with claim 1 wherein said load carrying balls and said idler balls are carried in said tracks by retaining means.

6. An anti-friction ball bearing assembly in accordance with claim 1 wherein said idler balls are plastic balls and are in a preloaded state between said load carrying balls thereby exerting a preloaded force on said load carrying balls.

7. An anti-friction ball bearing assembly in accordance with claim 1 wherein there is one idler ball interposed between two adjacent load carrying balls.

* * * * *